United States Patent
Rosenthal et al.

(10) Patent No.: US 6,985,294 B1
(45) Date of Patent: Jan. 10, 2006

(54) FULL SPECTRUM COLOR PROJECTOR

(76) Inventors: Eric Rosenthal, 191 Beacon Hill Rd., Moganville, NJ (US) 07751-4208; Richard Jay Solomon, P.O. Box 187, Monson, MA (US) 01057; Clark Johnson, 5657 Steeplechase Dr., Wanakee, WI (US) 53597

( * ) Notice: Subject to any disclaimer, the term of this patent is extended or adjusted under 35 U.S.C. 154(b) by 0 days.

(21) Appl. No.: 10/805,735

(22) Filed: Mar. 22, 2004

Related U.S. Application Data

(60) Provisional application No. 60/458,190, filed on Mar. 27, 2003, provisional application No. 60/458,799, filed on Mar. 28, 2003.

(51) Int. Cl.
*G02B 5/18* (2006.01)
(52) U.S. Cl. ............ 359/573; 359/572; 359/566; 359/291
(58) Field of Classification Search ........... 359/566, 359/571, 572, 573, 291, 292, 295
See application file for complete search history.

(56) References Cited

U.S. PATENT DOCUMENTS 5,629,802 A * 5/1997 Clark .................. 359/573
6,859,275 B2 * 2/2005 Fateley et al. ........ 356/330

* cited by examiner

*Primary Examiner*—Fayez G. Assaf

(57) ABSTRACT

An apparatus providing full spectrum electronic images includes a full-spectrum light source, a programmable diffraction grating to separate light from the source into its spectral components, a reflection system controllable on a pixel by pixel basis to modulate light output from the diffraction grating, and a scanning mirror to form an image from light modulated by the reflection system. A related method for displaying a full spectrum image includes providing full spectrum light, using a diffraction grating to separate the light into its spectral components, and for each pixel of the image, modulating the intensity of the spectral components to produce a light output characteristic of such pixel, and additionally using a scanning mirror arrangement to form the image.

14 Claims, 2 Drawing Sheets

Figure 2

Column 20                                          20'
Violet                                              Row 21
Blue
Green
Yellow
Orange
Red                                                 Row 21'

FULL SPECTRUM COLOR PROJECTOR

CROSS REFERENCE TO RELATED APPLICATIONS

The present application claims priority from provisional application 60/458,190, filed 27-Mar-03, and provisional application 60/458,799, filed 28-Mar-03. These related applications are hereby incorporated herein by reference.

Patent application Ser. No. 10/786,271 filed 27-Mar.-2003 and patent application Ser. No. 10/798,159 filed 28-Mar-2003 are hereby incorporated herein by reference.

TECHNICAL FIELD

This invention relates to a method of displaying the full, continuous spectral energy of an image, based on new principles. Human vision is capable of hyper acutance and hyper spectral sensitivity beyond what an understanding of current physical optics would predict. This new methodology will significantly improve and enhance electronic images by optimizing the human visual interface.

BACKGROUND ART

The human vision system has evolved based on an environment for processing information that exists only in nature under continuous full spectrum ambient lighting conditions. Relatively recently, during the past 400 years, we have exposed our vision systems to unusual new requirements. The reading of printed text and pictures in artificial light, photographs, television and computer displays, all have colors restricted fundamentally to three to five color primaries.

Most film, video, digital cameras and display systems are based upon the three-color, metameric theory of chromatic capture, using red-green-blue or cyan-magenta-yellow primaries. Hence, the color range or gamut is limited by the selected color primaries supported by the display systems. In addition, the spectral range of conventional systems is constrained to these primaries rather than capturing the full radiant spectral signature of a scene. The full spectrum is necessary to replicate what the human vision system is capable of seeing. The full spectrum is also required for further analysis for scientific and surveillance applications.

Metameric or combinatory systems are based on a mathematical representation whereby it can be shown that any color that can be sensed by a human may be created by combining only three unique, suitably spaced spectral primaries. However, the inverse is not true: three unique, fixed primaries cannot create all colors. In order to cover the entire spectrum of human sense, primaries either have to be expanded to more than three or shifted to cover the spectra being replicated. Yet even with expanded primary systems, the bandwidth of the primaries and their consequent metamer are critical parameters, and cannot accurately represent the continuous spectral functions or chromatic separation that a normal human is capable of perceiving. Where illumination is non-continuous, such as a fluorescent lamp, its band or line spectra further complicates metameric chromatic capture and replication. Four or five primaries are sometimes used for ink on paper or special displays, thus expanding the gamut somewhat, but still cannot reproduce all of the colors that humans can see.

Furthermore, metameric models cannot represent the full radiant spectral energy in a scene. The metameric representation of color is only a psychophysical phenomenon dependent on human perceptual processes. This conventional technique is not a physical representation of the reflective or luminescent spectra for the purposes of spectral analysis. The use of metameric primaries for chromatic representation also excludes valuable data located in the invisible regions of the spectrum, including X-rays, the ultraviolet and infrared.

A conventional display system based on combining filtered colors cannot perfectly replicate what a human can see in the field, where the human visual system is capable of sensing a spectrum that cannot be physically displayed by select primary light sources. Furthermore, such conventional chromatic display systems are inflexible, since they are based on a mythical "standard" human observer, and therefore cannot be readily adjusted for human perceptual diversity or handicaps. Essentially, all tri-stimulus display systems based on optically filtered primaries are a form of data compression accomplished by discarding portions of the spectrum.

Recent biological research confirms that the perception of the full spectrum and full luminance in a scene, at high spatial and temporal resolutions, is minimally necessary for correctly replicating images with subtle chromatic nuances such as transparency, luminescence, mirror-reflectance and texture. It is also important to replicate the full continuous spectra of a scene to overcome numerous chromatic and other visual illusions and to achieve color constancy despite chromatic shifts in ambient lighting.

SUMMARY OF THE INVENTION

This invention is based on a principle that each pixel of a display is capable of generating the full spectral energy of any hue without the use of bandpass limiting color filters. The embodiments described herein are methods for displaying the small portions of the spectrum on a pixel-by-pixel basis. The methods display the spectral energy content of a scene by imaging onto a projection screen or other display surface.

In a specific embodiment, the invention provides a method of displaying the spectral content of an image. In this embodiment, the method includes:
 a) partitioning the image into an array of pixels, each pixel associated with a distinct energy element of the image;
 b) separately directing the full spectral energy of a light source to a spectral separator that separates the energy element into continuous spectral components,
 c) for each pixel, applying such spectral components that collectively represent its spectral composition; and
 d) for each pixel, using an amplitude value for each of its spectral components.

The following embodiments describe methods for displaying the small portions of the spectrum, up to the entire spectral energy content of a scene. The spectrum is imaged onto a projection screen or other display surface on a pixel-by-pixel basis, creating a frame of a full spatial image. Sequences of frames create a moving image. The spectrum covered in the image, depending on the parameters of the spectral separator, can span from the x-ray region, the ultraviolet, the visible, to the far infrared.

In the preferred embodiment a diffraction grating disperses incident electromagnetic energy into its constituent spectra. A diffraction grating is much more effective for dispersion than that effected by a prism. According to conventional art, this grating is blazed, having an array of inclined facets. In this embodiment, a full-spectrum, white light energy source is produced by a femto-second laser.

This continuum spans the full visible range, necessary for applications in spectroscopy. Femto-second lasers are pulsed lasers with a temporal width of approximately 100 femto-seconds. Femto-second lasers exhibit a phenomenon called white-light continuum generation. This phenomenon creates an high energy, ultra-short pulse. This pulse is focused into a glass, liquid, or rare gas, and produces a coherent white light from the near-IR to the ultraviolet. In accordance with this invention, the femto-second laser in combination with the blazed grating, produces an optimum spectral source for each pixel, with a minimum of wasted energy. This method works as follows:

Light falling on the reflection grating is dispersed into a series of spectra on both sides of the incident beam, the angular dispersion being inversely proportional to the line spacing. By shaping of the blaze angle using various techniques, the grooves are formed to concentrate most of the energy into a single spectral order. With ordinary, non-coherent, full spectrum white light, the higher orders of the diffracted light would produce unwanted wavelengths. These unwanted wavelengths potentially could add chromatic fringing to the pixilated image as well as waste spectra energy. In conventional art, these unwanted wavelengths are attenuated with additional filters or with a prism monochromator. In the present invention, potential higher order wavelengths are attenuated by modulating the coherent femto-second laser pulsed light and controlling the diffraction grating itself, as described in the selected embodiments for this present invention. The slit size determines the bandpass characteristics of the diffracted spectrum at each given wavelength.

In another embodiment, cast replica gratings are used as transmitting diffraction gratings.

In another embodiment, the diffraction gratings are made with a holographic method known to the art. This method is as follows: a series of interference fringes, corresponding to the grooves of the grating, are recorded on a photosensitive layer on the substrate. The substrate is treated chemically forming a modulated profile on the surface of the substrate by selective dissolution.

In a related embodiment, a flexible diffraction grating which is capable of changing its dimensions modulates the bandwidth of the illuminating source spectral components for each pixel. The spectrum dispersed by a diffraction grating depends upon the grating line density. The grating in this embodiment is capable of slightly expanding or contracting in a controlled manner so as to differentially produce a very high spectral resolution by selecting tiny segments of the spectrum.

A method for expanding the spectra in accordance with this invention is as follows:

A flexible optical diffraction grating is securely affixed to a rigid base material with electrostrictive characteristics. Commonly used piezoelectric ceramic composition materials with electrostrictive characteristics are barium titanate, lead zirconate titanate, lead metaniobate, and lead magnesium niobate. Such base materials are manufactured by: Alpha Ceramics, Inc., 5121 Winnetka Avenue North, Suite 100, Minneapolis, Minn. 55428, phone: 763.535.9660, fax: 763.535.9655; and Morgan Electro Ceramics, Inc. Thornhill Southampton Hants, SO19 7TG England, phone: +44-23-8044-4811; fax: +44-23-8043-1768.

In this method, the attached optical grating, being rigidly affixed to the electrostrictive material substrate expands or contracts, respectively, upon the application of an electric field with a modulation function. The light output from the diffraction grating follows the modulation function whose radiance amplitude is proportional to the difference in the total integrated light impinging upon the grating.

In another embodiment of this invention the substrate is a magnetostrictive material which expands or contracts, respectively upon the application of an magnetic field modulation function.

In both embodiments, full-spectrum coherent light is applied to the gratings from a femto-second laser. The laser generates energy across the entire light spectrum, originating from a single short pulse. The laser produces a coherent, full-spectrum white light continuum at all wavelengths. The flexible gratings are modulated with phased-array techniques. Phased-array modulation of the reflected, full spectrum, coherent white light continuum facilitates the production of subsets of spectra with extremely narrow bandwidths.

In one embodiment, the spectrum covers the entire visible spectrum as perceived by the human vision system.

In other embodiments, the spectrum covered, depending on the parameters of the spectral separator, spans from the x-ray region, the ultraviolet, the visible to the far infrared for analysis.

In a related embodiment, in accordance with this invention, the spectral separations received by the projector device are mapped for display according the perceptual spectral separations of an individual viewer.

Other related embodiments include an apparatus that implements the methods described in this invention.

BRIEF DESCRIPTION OF THE DRAWINGS

The foregoing features of the invention will be more readily understood by reference to the following detailed description, taken with reference to the accompanying drawings, in which:

FIG. 2 is an exploded diagram of the mirror array light modulator.

DEFINITIONS

Figure 1:
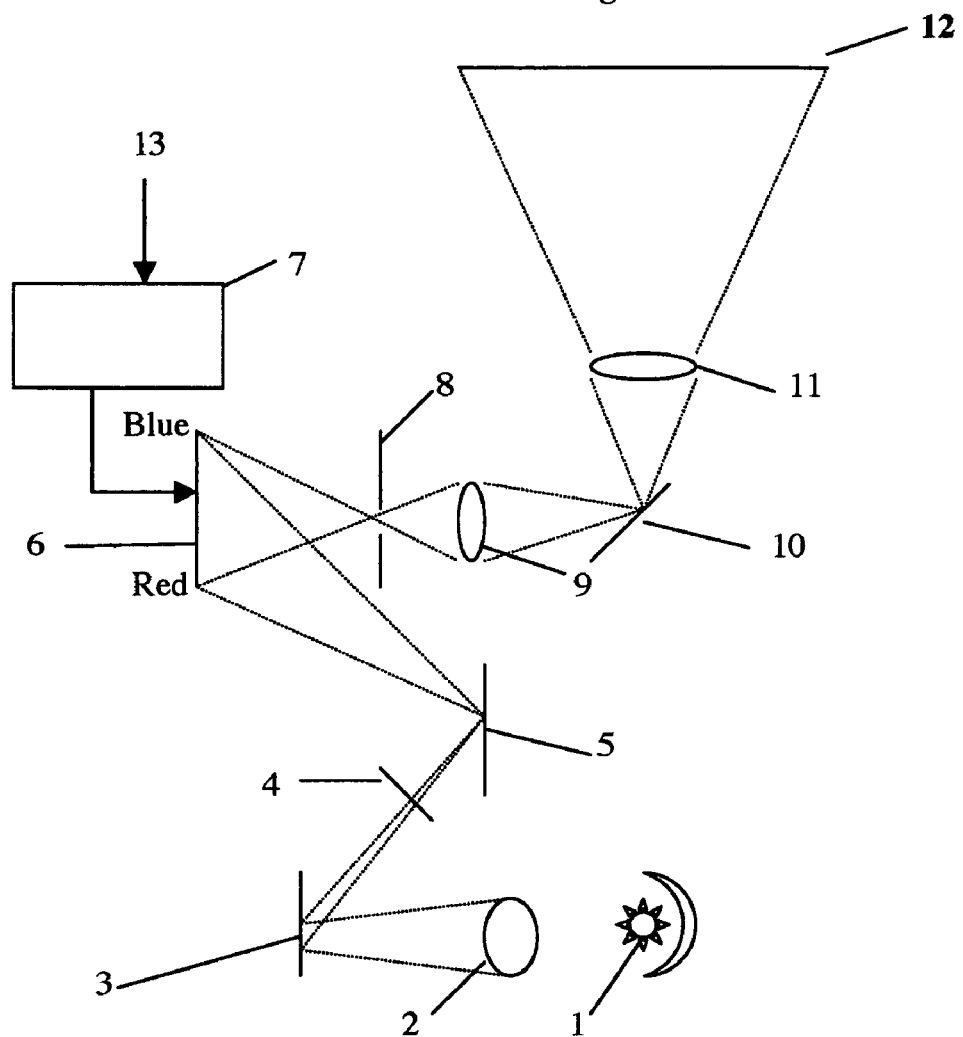
FIG. 1 is a system comprising the light source, light modulator and projector.

As used in this description and the accompanying claims of the present invention, the following terms shall have the meanings indicated, unless the context otherwise requires:

A diffraction grating is an optical device used to separate the different wavelengths or colors contained in a ray of light or electromagnetic energy into its constituent components. As known in the art, the device conventionally consists of thousands of narrow, closely and uniformly spaced parallel grooves acting as multiple diffraction elements. The intensity of the light passing through the grooves, due to the interference phenomenon of light waves, depends upon the direction of the light propagation. This invention uses a single slit to reduce second and third order components.

Entrance aperture. A slit acts as an entrance aperture to the diffraction grating. An optical fiber can also act as an entrance aperture.

DETAILED DESCRIPTION OF SPECIFIC EMBODIMENTS

Referring to FIG. 1, the preferred embodiment of the projector in this invention has a full, continuous-spectrum light source 1 covering the spectral region to be imaged. In a specific embodiment of the invention this light source is a femto-second laser weakly focused onto a transparent medium. (Laboratory versions of femto-second lasers have been produced by Bell Laboratories, Holmdel, N.J. and Universität Gesamthochschule Kassel, Mönchebergstraβe 19, 34109 Kassel, Germany, phone: +49-561 804-0, fax: +49-561 804-2330.) This method of using a femto-second laser generates energy across the entire light spectrum, originating from a single short pulse in the femto-second laser, producing coherent light at all wavelengths.

In another embodiment a conventional quartz halogen lamp at 1 is used as a full spectrum light source. The quartz halogen lamp 1 requires a cold mirror or an infrared absorbing reflector to dissipate excess energy. In those embodiments, a lens 2 collects and focuses the light onto a cold mirror 3 where the infrared energy of the light source is attenuated.

The full continuous-spectrum light continues through slit 4. The light is focused onto diffraction grating 5. The diffraction grating disperses the full spectrum white light into its component parts, and the dispersed beam is then directed onto the surface of a 1024×768 digital micro-mirror modulator array 6. An example of a drive electronics module 7 combined with a digital micro-mirror 6 is the model DMD 0.7XGA DDR 12 Discovery 1000 development system manufactured by Productivity Systems, Inc., 1711 Analog Drive, Richardson, Tex. 75081-1944, phone: 972-479-9484, fax: 972-479-9485.

In a related embodiment of this invention, diffraction grating 5 is capable of changing its dimensions so as to modulate the bandwidth of the illuminating source spectral components for each pixel. The grating in this embodiment is capable of slightly expanding or contracting in a controlled manner so as to differentially produce a very high spectral resolution by selecting tiny segments of the spectrum. This modulation is done via a magnetostrictive substrate. In another embodiment, modulation is done via an electrostrictive substrate.

FIG. 2 is an exploded view of an 1024 column×768 row digital micro-mirror modulator array 6 from FIG. 1. This array is organized to represent one line of a frame of a spatial image. Each column 20 in FIG. 2 represents the continuous full spectrum of an individual pixel in an image line. Each of the 1024 columns 20 . . . 20' contains pixels for 768 rows 21 . . . 21'. Each row of pixels 21 . . . 21' is illuminated by the diffraction pattern from the full-spectrum white light source (1 in FIG. 1) such that all the pixels in the first row are illuminated with light from the shortest wavelength (blue-violet) end of the visible spectrum, and all the pixels in 768$^{th}$ row are illuminated with light from the longest wavelength (red) end of the visible spectrum. The rows in between these spectral ends are illuminated with light from the components of the spectrum as dispersed by the diffraction pattern of white light, in accordance with the present invention. The radiance function, dispersed component separation, and spectral shifts in this spectral range represents the requirements for chromatic separation, such as false color representations beyond human visual perception in the infrared and ultraviolet, spectral separations greater than a human can see, and related visual applications.

As an example of an embodiment, the DDR 12 development system is capable of taking an input signal and driving the individual micro-mirror elements of the DMD at extremely high speed to perform the following micro-mirror driving functions:

Each pixel in a column 21 . . . 21' of FIG. 2 represents a 0.52 nanometer width of the visible light spectrum. Each pixel micro mirror may be moved plus or minus 12 degrees via the DDR 12 drive electronics. A specific mirror is so angled that light at a specified wavelength to be displayed for a specific pixel reflects off that pixel's micro mirror. Referring again to FIG. 1, the light from the specific pixel is directed at the slit 8 such that light at that wavelength is directed to the display screen 12. Light at all other wavelengths is blocked by the slit and not directed toward the display screen. Pulse duration modulation of up to 3500 Hertz is applied to any selected pixel micro mirror to define the radiance amplitude level for that particular wavelength.

To construct a full frame on screen 12, this method is followed: all of the relevant pixels in the 1024×768 micromirror array 6 are modulated in accordance with the present invention so that the spectral and radiance functions of all pixels in a single line is defined. Light that has been directed through slit 8 is reflected by frame rate scanning front surface mirror 10 directed toward projection lens 11. The image of the first line is focused onto the display screen 12 for viewing. Scanning mirror 10 is repositioned for the next line of image information and the micro-mirror array 6 is modulated with the image information from the second line. This method is repeated for 768 lines to complete the frame image.

For motion imaging, this method is followed: in subsequent frames only the micro mirrors associated with pixels that have changed either spectral or radiance amplitude are readdressed. These readdressed micro mirrors are repositioned and modulated with the new frame spectral and radiance information. There is no requirement to completely readdress the entire array for each line of each frame since each pixel can be addressed individually to perform the changes between frames. Refresh rates are chosen higher than the human psychophysical flicker fusion thresholds. With only pixels that change parameters being re-modulated, the screen display 12 shows essentially a coherent display of a full moving image.

In a further embodiment of the invention, higher frame rates and higher resolution digital micro-mirror arrays, along with appropriate pixel and frame clocking rates, generate images in different spatial and temporal display formats.

In other embodiments, functionally equivalent devices to the digital micro-mirror arrays and drive electronics are used to produce full-spectrum images.

What is claimed is:

1. An apparatus to provide full spectrum images comprising:
    a) a full-spectrum light source;
    b) a programmable diffraction grating to separate light from the source into its spectral components;
    c) a reflection system controllable on a pixel by pixel basis to modulate light output from the diffraction grating; and
    d) a scanning mirror to form an image from light modulated by the reflection system.

2. An apparatus according to claim 1 wherein the light source is a femto-second laser.

3. An apparatus according to claim 1 wherein the reflection system is a digital micro-mirror device.

4. An apparatus according to claim 1, for motion imaging at a selected frame rate, wherein the scanning mirror is a multisided, front-surface mirror vibrating in synchronism with the frame rate.

5. An apparatus according to claim 1, wherein the grating is electrically deformable.

6. An apparatus according to claim 5, wherein the grating is affixed to an electrically deformable substrate.

7. An apparatus according to claim 1, wherein the grating is magnetically deformable.

8. An apparatus according to claim 1, wherein the grating is mounted to a magnetically deformable substrate.

9. A method for displaying a full spectrum image, the method comprising:
  providing full spectrum light;
  using a diffraction grating to separate the light into its spectral components; and for each pixel of the image;
  modulating the intensity of the spectral components from the diffraction grating to produce a light output characteristic of such pixel; and
  using a scanning mirror arrangement to form the image.

10. A method according to claim 9, wherein modulating the intensity of the spectral components includes using an array of micro-mirrors.

11. A method according to claim 9, wherein the diffraction grating is deformable, and using the diffraction grating includes deforming it in a controlled manner so to permit selection of desired spectral components.

12. A method according to claim 11, wherein deforming the grating includes using an electrically deformable substrate to which the grating is mechanically coupled.

13. A method according to claim 11, wherein deforming the grating includes using a magneto-strictive substrate to which the grating is mechanically coupled.

14. A method according to claim 9, wherein providing full spectrum light includes using a femto-second laser.

* * * * *